(12) United States Patent
Brown et al.

(10) Patent No.: US 6,390,800 B1
(45) Date of Patent: May 21, 2002

(54) APPARATUS FOR REMOVING THREADED PARTS FROM PLASTIC INJECTION MOLDS

(75) Inventors: David R. Brown, Long Ford Mill; Henry J. Rozema, Brampton, both of (CA)

(73) Assignee: Unique Mould Makers Limited, Brampton (CA)

( * ) Notice: Subject to any disclaimer, the term of this patent is extended or adjusted under 35 U.S.C. 154(b) by 126 days.

(21) Appl. No.: 09/583,546

(22) Filed: Jun. 1, 2000

(51) Int. Cl.⁷ ............................... B28B 7/10; B29D 1/00
(52) U.S. Cl. .................... 425/436 R; 249/59; 264/318; 264/334; 425/191; 425/437; 425/438; 425/809; 425/DIG. 58
(58) Field of Search ...................... 425/DIG. 58, 436 R, 425/809, 556, 191, 437, 438; 264/318, 334, 335; 249/259

(56) References Cited

U.S. PATENT DOCUMENTS

| | | | |
|---|---|---|---|
| 2,217,661 A | 10/1940 | Anderson | 425/351 |
| 2,306,205 A | 12/1942 | Crosman, Jr. | 425/351 |
| 2,408,630 A | 10/1946 | Green | 425/352 |
| 2,441,525 A | 5/1948 | Zesbaugh | 425/436 RM |
| 3,537,676 A | 11/1970 | Miller | 249/59 |
| 3,651,185 A * | 3/1972 | Menkel | 264/550 |
| 3,718,419 A | 2/1973 | Adamo | 425/438 |
| 5,383,780 A | 1/1995 | McCready | 425/552 |
| 5,421,717 A * | 6/1995 | Hynds | 425/556 |
| 5,776,521 A * | 7/1998 | Wright et al. | 425/556 |
| 5,786,079 A | 7/1998 | Alieri | 425/349 |
| 5,788,911 A * | 8/1998 | Normura et al. | 264/318 |
| 6,177,041 B1 * | 1/2001 | Bietzer | 264/318 |
| 6,238,202 B1 * | 5/2001 | Joseph | 425/556 |
| 6,241,931 B1 * | 6/2001 | Ciccone et al. | 264/318 |

FOREIGN PATENT DOCUMENTS

JP    62-264923    11/1987    ................ 425/438

* cited by examiner

*Primary Examiner*—Nam Nguyen
*Assistant Examiner*—Emmanuel Luk
(74) *Attorney, Agent, or Firm*—Ridout & Maybee LLP

(57) ABSTRACT

An apparatus for forming threaded molded parts such as closures for containers having improved means for unthreading the formed part from the mold core. The apparatus includes a cavity part and a core part, the cavity part being rotatable relative to the core part, such that simultaneous rotation of the cavity and opening of the mold results in unthreading of the part from the core. The mold cavity is rotationally coupled to a mold cavity rotator which is preferably driven by means of a rack. The rotation of the mold cavity is timed with the mold opening step such that the threaded part is unthreaded from the core as the mold plates are separated.

14 Claims, 5 Drawing Sheets

APPARATUS FOR REMOVING THREADED PARTS FROM PLASTIC INJECTION MOLDS

FIELD OF THE INVENTION

This invention relates to injection molding, and more particularly to an apparatus and method for removing internally threaded plastic parts, such as container closures, from the mold core of an injection mold.

BACKGROUND OF THE INVENTION

Injection molding generally involves introducing molten plastic under pressure into a space defined between a core part and a cavity part of an injection mold. The molten plastic injected into the space is allowed to coot and thereby solidify to form a "part", after which the core and cavity parts are separated. The part generally shrinks a small amount upon cooling and remains on the core part of the mold from which it must be removed or "stripped".

The removal of internally threaded parts from a threaded core has in the past presented a problem. Parts with shallow threads may sometimes be forced off the core using a stripper plate. However, deeper threads would be damaged by any effort to force them off the core with a stripper plate, and therefore are preferably removed by rotation or "unthreading" of the part from the core.

A number of devices and methods are known for simultaneously unthreading and pushing a threaded part from a mold core. One example of such a device is described in U.S. Pat. No. 5,383,780 (McCready et al.). The McCready apparatus includes a rotatable stripper ring which surrounds the mold core. After the part is formed and the mold is opened by separating the cavity part from the mold core, the stripper ring is rotated and simultaneously lifted relative to the core, simultaneously unthreading and pushing the threaded part away from the core. It is also known in the prior art to provide a rotatable core which is unthreaded from the part. Examples of patents which utilize a rotatable core are U.S. Pat. No. 2,306,205 (Crosman, Jr.) and Japanese Patent Application No. 62-264923.

Known devices for stripping threaded parts from a mold core have numerous disadvantages, such as increasing the size and complexity of the molding apparatus and reducing the speed of the molding process. Increased complexity can result in increased equipment and maintenance costs, while increased size can limit the number of mold levels which may be accommodated in a molding apparatus.

Accordingly, an improved method and apparatus for removing threaded parts from plastic injection molds is required.

SUMMARY OF THE INVENTION

The present invention overcomes the above-described problems of the prior art by providing an apparatus and a method for removing threaded parts from plastic injection molds. In the apparatus of the present invention, the cavity part of the mold is rotatable relative to the core part, such that simultaneous rotation of the cavity and opening of the mold results in unthreading of the part from the core.

The apparatus for forming threaded molded parts according to the present invention comprises a first mold plate and a second mold plate. The apparatus has a mold closed position in which a mold is defined comprising the mold core and the mold cavity, and a mold open position in which the mold core and mold cavity are separated by a sufficient distance so as to permit removal of the part from the apparatus. The first mold plate (also referred to herein as the mold core plate) carries the mold core, the core having an external threaded surface. The second mold plate (also referred to herein as the mold cavity plate) carries the mold cavity, which is rotatable about a mold axis parallel to the direction of relative movement of the mold plates.

The mold cavity is rotationally coupled to a mold cavity rotator which is preferably driven by means of a rack. The rotation of the mold cavity is timed with the mold opening step such that the threaded part is unthreaded from the core as the mold plates are separated. The rotator for the mold cavity preferably comprises a rotatable shaft and a radially extending drive pinion. The shaft has gear teeth and is driven by the rack. Thus, movement of the rack results in rotation of the drive pinion, which meshes with a pinion extending radially about the mold cavity, causing rotation of the mold cavity.

The apparatus according to the invention preferably also includes a third mold plate (also referred to herein as the mold stripper plate) which carries a stripper ring. The stripper ring is axially movable relative to the core and is used to eject the part from the core after it is completely unthreaded. Preferably, the stripper ring is provided with at least one air passage through which pressurized air can be passed to assist in ejecting the unthreaded part from the core.

Since the part is unthreaded by the rotating mold cavity, it is desirable to prevent the part from rotating relative to the mold cavity during unthreading. Plastic closures for containers typically have an outer serrated surface to assist in unscrewing the closure from the container. These serrations on the part correspond to serrations provided on an inner axial surface of the mold cavity and advantageously provide sufficient resistance to relative rotation of the part and the mold cavity during unthreading.

In order to ensure that the part becomes separated from the mold cavity after it is unthreaded from the core, the apparatus preferably includes means to hold the part to the core until after the part is substantially completely unthreaded and the mold cavity is withdrawn from the part. In a preferred aspect of the invention, a negative pressure is created in a space which is formed between the part and the mold core as the part is unthreaded, and preferably near the end of the unthreading operation. This negative pressure is preferably applied through an air passage extending through the core.

The apparatus and method for forming threaded molded parts have a number of advantages over the prior art. Firstly, the mechanism for rotating the mold cavity is relatively simple, which can reduce equipment and maintenance costs and improve reliability. Secondly, the mechanism for rotating the mold cavity is relatively compact, permitting it to be housed in a single mold plate. This may permit a greater number of mold levels to be stacked in the press of an injection molding apparatus. Thirdly, in the apparatus and method of the invention, the part is unthreaded from the core as the mold plates are separated, eliminating the need for a separate mold opening step, thus improving the speed of the molding process.

BRIEF DESCRIPTION OF THE DRAWINGS

Preferred embodiments of the invention will now be described, by way of example only, with reference to the accompanying drawings, in which.

DETAILED DESCRIPTION OF PREFERRED EMBODIMENTS

Figure 1:
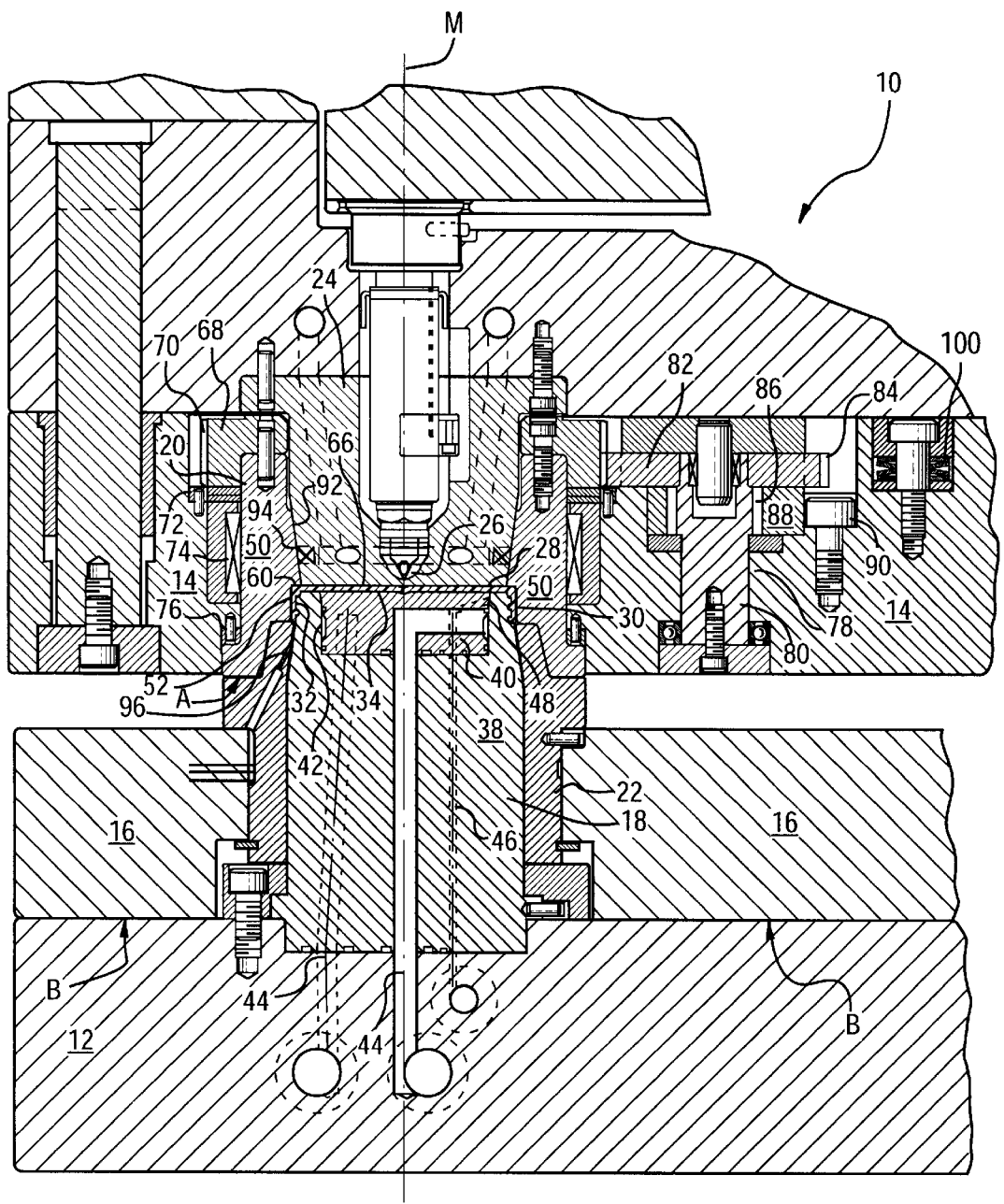
FIG. 1 is a sectional view through a preferred apparatus according to the present invention in the "mold closed" position.

A preferred apparatus according to the present invention is generally indicated by reference numeral 10 in the drawings. The apparatus 10 comprises three mold plates, namely a mold core plate 12, a mold cavity plate 14 and a mold stripper plate 16. A mold core 18 is mounted in the mold core plate 12, a mold cavity 20 is rotatably mounted in the mold cavity plate 14, and an annular stripper ring 22 is mounted in the mold stripper plate 16 and surrounds the mold core 18. The apparatus 10 further comprises a gate insert 24 including an injection nozzle 26 through which molten plastic is supplied into the mold.

In the mold closed position shown in FIG. 1, the mold cavity 20 and the stripper ring 22 engage one another along line A, and the core plate 12 and the stripper plate 16 engage one another along line B. The mold core 18 defines an inner surface of the part 30, and the mold cavity 20, stripper ring 22 and gate insert 24 together define an outer surface of the part 30 mold 28 in which a part 30 is formed.

In the preferred embodiment of the invention shown in the drawings, the part 30 comprises an internally threaded closure, such as a threaded lid for a container. The inner surfaces of the threaded part 30 are defined by the mold core 18, which has an external threaded surface 32 extending generally parallel to mold axis M and a planar surface 34 transverse to the mold axis. The mold core 18 preferably comprises a mold core body 38 having a depression in its upper surface in which is received a generally cylindrical core insert 40 having a side wall 42. Internal passages 44 are provided through the core body 38 and core insert 40 for coolant circulation and an air passage 46 extends along the mold axis upwardly through the core body 38 and into the core insert 40, where it is redirected to an opening provided in the side wall 42 of core insert 40. The air passage 46 thereby communicates with an annular venting gap 48 between the core body 38 and core insert 40. Venting gap 48 opens into the mold 28 and permits escape of air from the mold 28 during injection of plastic. However, gap 48 is sufficiently narrow that molten plastic will not substantially enter the gap 48 during molding.

Figure 5:
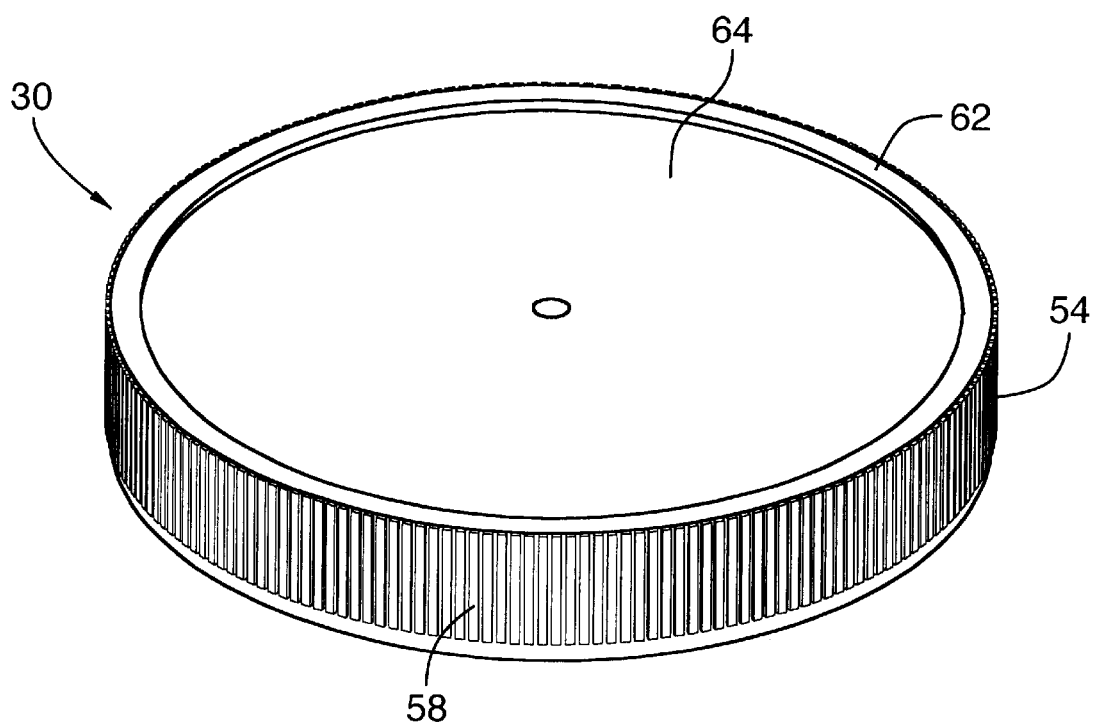
FIG. 5 is a perspective view of a part which is molded in the apparatus of FIG. 1.

A major portion of the outer surface of the threaded part 30 is defined by the mold cavity 20 and the gate insert 24. The mold cavity 20 comprises a generally annular body 50 having an inner surface which defines a portion of the outer surface of the part 30. In the preferred embodiment shown in the drawings, the mold cavity 20 has an inner axial surface 52 which forms an outer circumferential surface 54 of the part 28. Preferably, the inner axial surface 52 of mold cavity 20 is provided with serrations 56 (not shown) to form corresponding serrations 58 (FIG. 5) on the outer circumferential surface 54 of the part 30. The mold cavity 20 also has an inner transverse surface 60 defining an outer peripheral surface 62 of the top of part 30. The central portion 64 of the top of part 30 is defined by a transverse surface 66 of gate insert 24.

The mold cavity 20 also comprises an annular pinion gear 68 having teeth 70. Pinion gear 68 is secured to annular body 50 and extends radially outwardly therefrom. The mold cavity 20 comprising annular body 50 and pinion gear 68 is rotatable about the mold axis on bearing surfaces 72, 74 and 76.

The apparatus 10 also comprises a mold cavity rotator 78 comprising an axially extending shaft 80 which is mounted in mold cavity plate 14 for rotation parallel to the mold axis. The upper end of shaft 80 is provided with a radially extending drive pinion 82 having teeth 84 which mesh with the teeth 70 of pinion gear 68. The shaft 80 is provided with teeth 86 below the drive pinion 82 which engage teeth on a rack 88 which is movable transverse to the mold axis. Followers 90 are mounted in the mold cavity plate 14 in order to maintain engagement between the rack 88 and the shaft 80.

As shown in the drawings, the gate insert 24 has an outer tapered surface 92 which has a truncated conical shape and which tapers inwardly and downwardly toward transverse surface 66 of gate insert 24. The tapered surface 92 of gate insert 24 forms a seat against a conical inner surface 94 of the mold cavity 14 in the mold closed position shown in FIG. 1. The gate insert 24 is movable along the mold axis relative to the mold cavity plate 14, allowing the gate insert 24 to be slightly withdrawn out of engagement with the mold cavity 20 after molding of part 28 and prior to unthreading. For example, the gate insert 24 may be withdrawn by about 0.03 inches. Preferably, the initial separation of gate insert 24 from cavity 20 is produced by disc spring assembly 100 shown in FIGS. 2 to 4.

Figure 3:
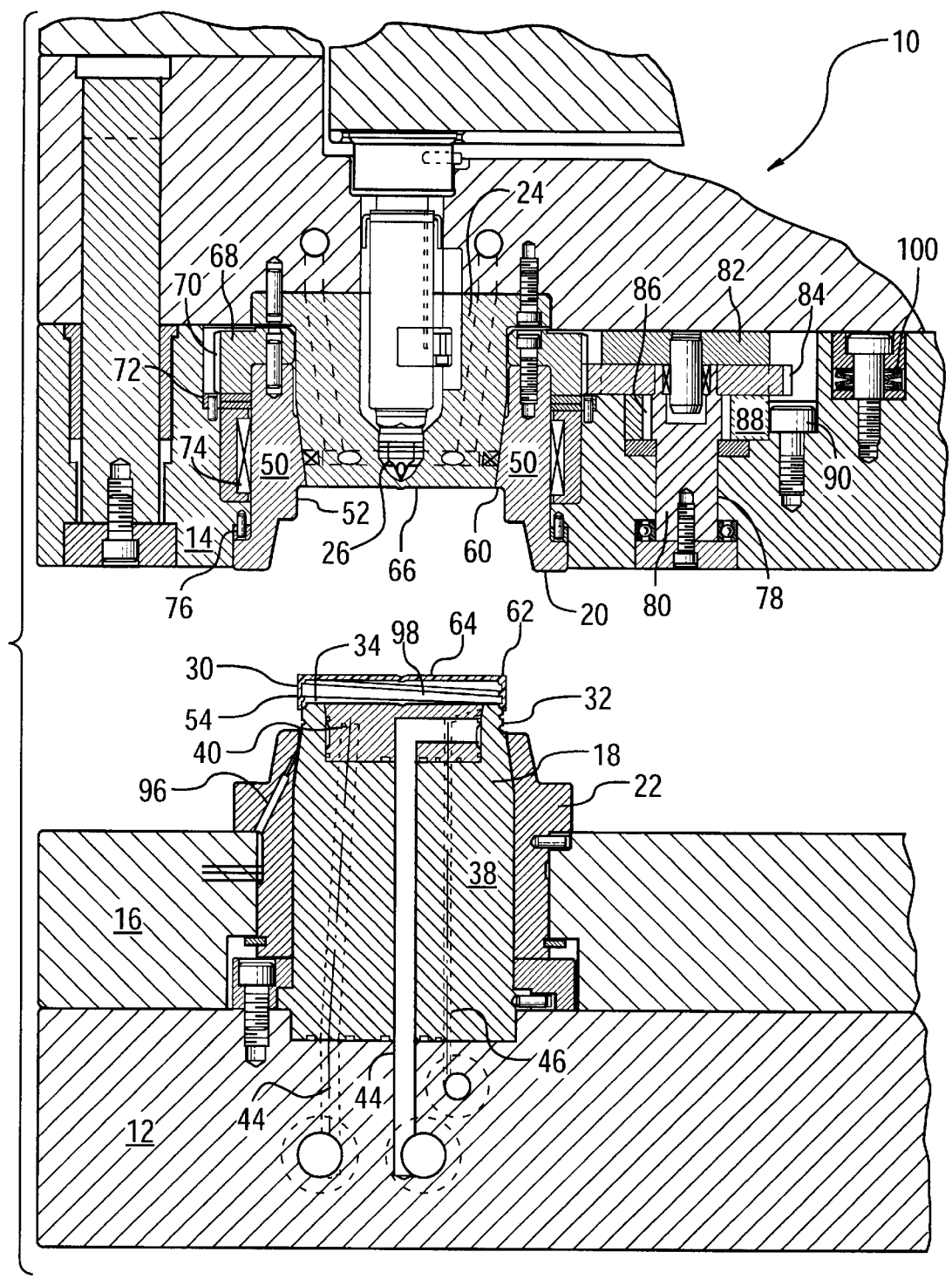
FIG. 3 is a sectional view through the apparatus of FIG. 1 in the "mold open" position, and prior to ejection of the part from the core.
Figure 4:
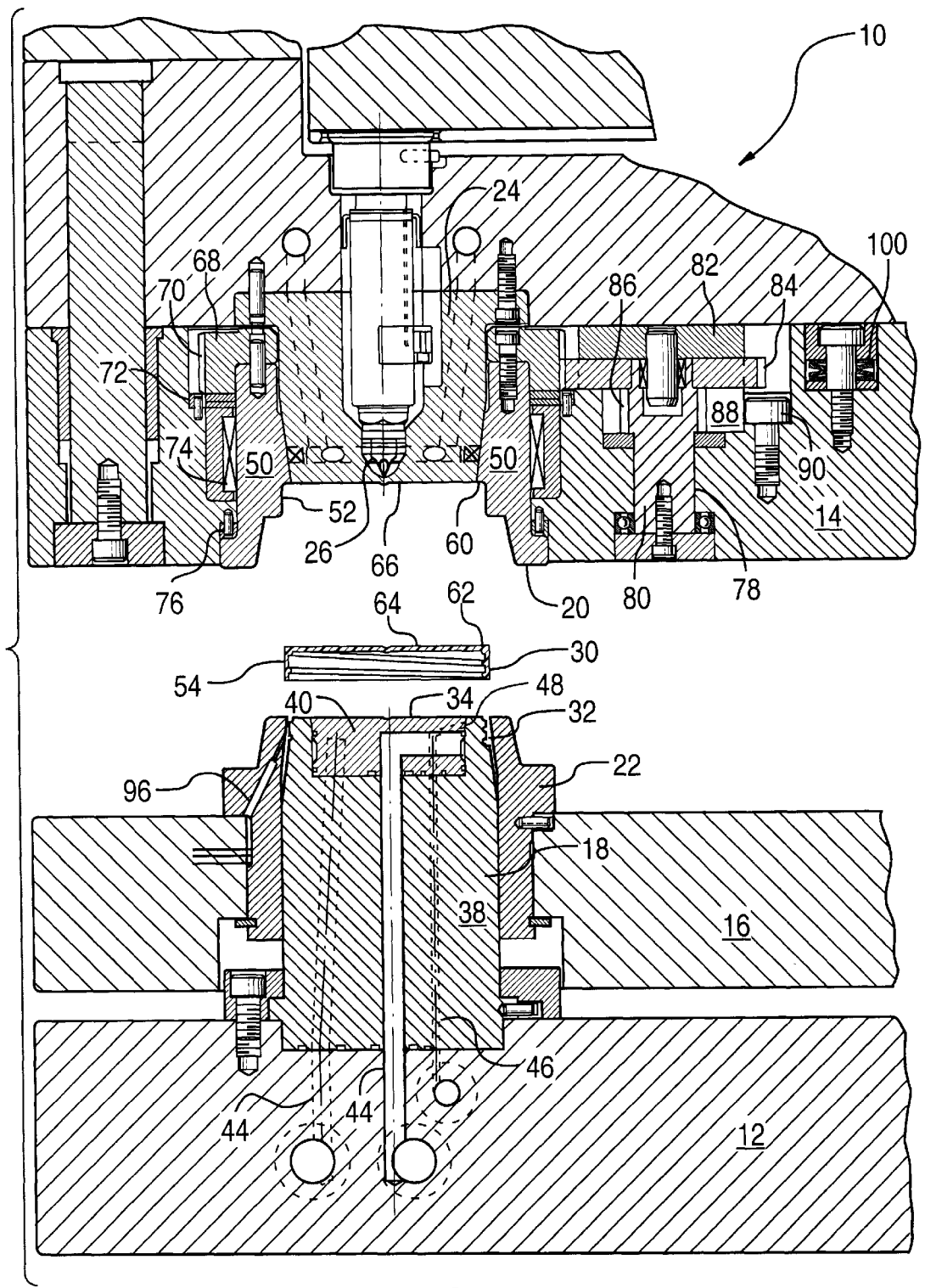
FIG. 4 is a sectional view through the apparatus of FIG. 1 after ejection of the part by the stripper ring.

The apparatus 10 further comprises a stripper ring 22 which surrounds the core 18 and is mounted in mold stripper plate 16. After the part has become substantially unthreaded as shown in FIG. 3, the mold core plate 12 and the mold stripper plate 16 are axially moved away from one another, causing the stripper ring 22 to eject the part from the core 18 as shown in FIG. 4. The stripper ring 22 is preferably provided with at least one air passage 96 through which pressurized air can be passed in order to assist in ejecting the part 30 from core 18 after unthreading has been substantially completed. Air passages are preferably directed upwardly and inwardly so as to direct the pressurized air inside the part 28. More preferably, a plurality of such air passages 96 are provided. The term "substantially unthreaded" is used herein to indicate that after the unthreading operation a portion of the thread of the part 30 may remain engaged with the thread of the core 18. Therefore, the apparatus 10 preferably includes stripper ring 22 to ensure that the part 30 will be removed from core 18.

A preferred method for molding an internally threaded plastic part according to the invention is now described below.

The first step in the method of the invention is to mold part 28 with the mold plates 12, 14 and 16 in the mold closed position shown in FIG. 1. In this position, the mold cavity 20 and stripper ring 22 engage one another along line A, and mold plates 12 and 16 engage one another along line B. In addition, gate insert 24 is completely inserted into mold cavity 20, such that the outer tapered surface 92 of the gate insert 24 is sealed against the inner tapered surface 94 of mold cavity 20.

After the molding operation has been completed, the gate insert 24 is axially withdrawn slightly from the mold cavity 16, preferably by about 0.03 inches, such that a space is formed between the outer tapered surface 92 of the gate insert 24 and the inner tapered surface 94 of the mold cavity 20. At this point, there is preferably no axial movement of mold cavity plate 14, and therefore the serrations 56 on the mold cavity 20 remain engaged with the serrations 58 on part 30.

The rack 88 is then moved transverse to the mold axis in order to cause rotation of the shaft 80 in the clockwise direction. Rotation of shaft 80 with drive pinion 82 causes rotation of the mold cavity 20 in a counterclockwise direction.

As the mold cavity 20 is rotated, the mold cavity 20 and mold core 18 become separated to open the mold 28. Preferably, the rate of separation of the mold cavity 20 and the mold core 18 during unthreading is substantially the same as the rate of axial movement of the part 30 relative to core 18, thus ensuring continued engagement between mold cavity 20 and part 30 during unthreading. The rate and timing of separating the mold cavity 20 and the mold core 18 relative to rotation of the mold cavity 20 is controlled by any convenient means (not shown), and is preferably controlled by program logic. The gate insert 24 moves with the cavity plate 14 so as to maintain the clearance between the gate insert 24 and the mold cavity 20 during unthreading of part 30.

Figure 2:
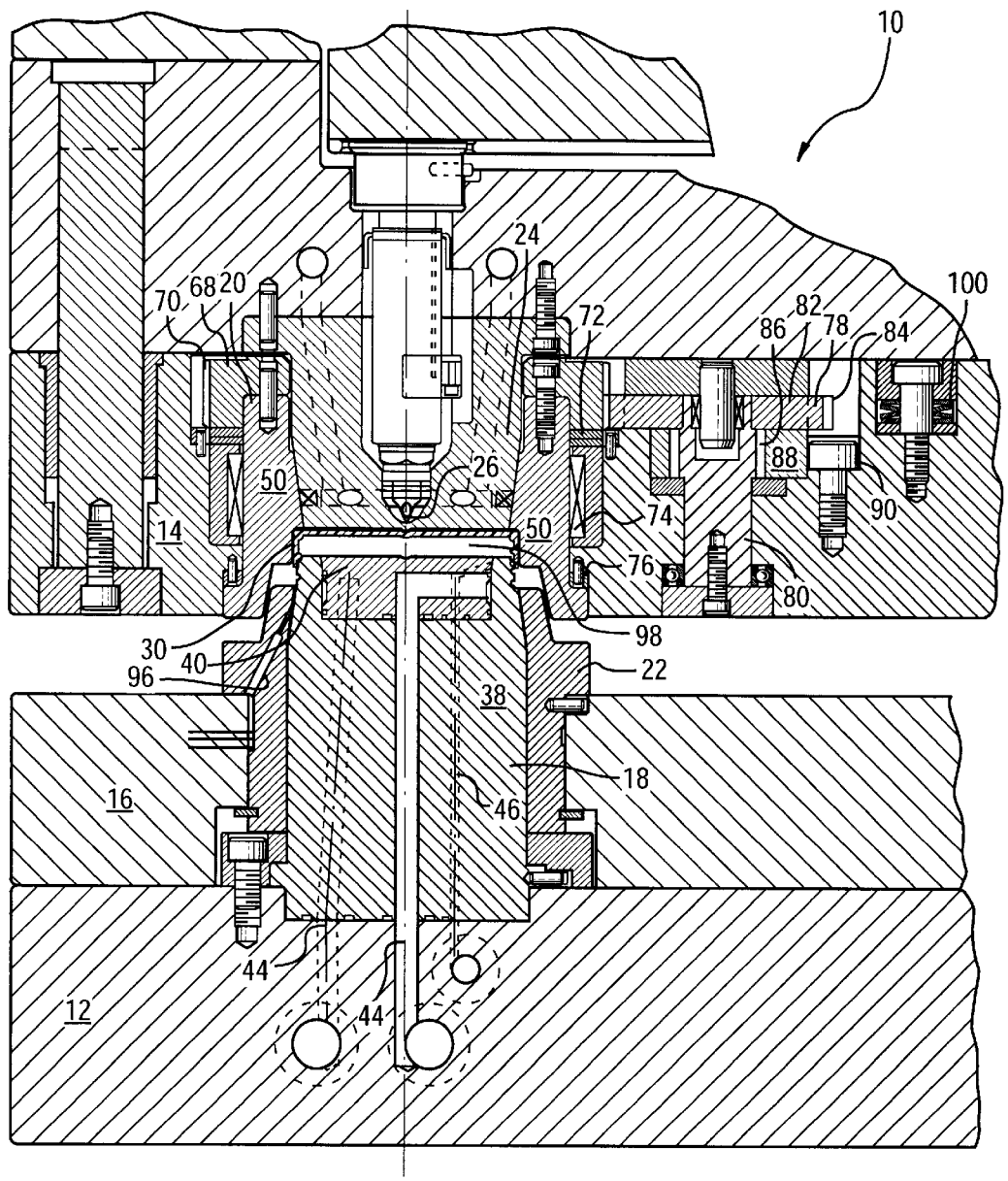
FIG. 2 is a sectional view through the apparatus of FIG. 1 after unthreading of the part from the core.

After the part 30 becomes substantially unthreaded from core 18 as shown in FIG. 2, the mold cavity 20 and the mold core 18 can be more rapidly separated from one another to the mold open position shown in FIG. 3, the separation being sufficient to allow ejection of the part 30 from core 18. During separation of the mold cavity 20 and mold core 18 to the mold open position, the mold cavity 20 becomes separated from part 30, which remains on the core 18. In order to ensure that the part 30 remains on the core 18 during removal of cavity 16, a negative pressure is created in the space 98 between the part 30 and the core 18 during separation of the mold cavity 20 and the mold core 18 and and until the mold cavity 20 becomes completely separated from part 30. The negative pressure is created by vacuum means (not shown) remote from the mold 26, and is applied to the space 98 between part 30 and core 18 through the air passage 46 and venting gap 48. Preferably, the negative pressure is applied only during the last portion of the unthreading step and during withdrawal of the mold cavity 20 away from part 30 in order to prevent "dishing" of the top surface of part 30, which may occur as a result of excessive application of negative pressure to space 98.

After the apparatus 10 is opened to the mold open position, the unthreaded part 28 is ejected from the core 18. In order to eject part 28, the application of vacuum is discontinued and the mold core plate 12 and mold stripper plate 16 are axially separated from one another as shown in FIG. 4, thereby causing stripper ring 22 to push the part 30 from the core 18. As discussed above, pressurized air is preferably passed through air passages 96 in stripper ring 22 to assist in ejection of part 30.

Although the invention has been described with reference to certain preferred embodiments, it is not intended to be limited thereto. Rather, the invention includes all embodiments which may fall within the scope of the following claims.

What is claimed is:

1. An apparatus for forming a threaded molded part, comprising:
   a first mold plate having a mold core, said mold core having an external threaded surface;
   a second mold plate having a mold cavity, said cavity being rotatable about a mold axis, wherein the apparatus has a mold closed position in a mold is defined comprising the mold core and the mold cavity, and a mold open position in which the cavity and core are separated by a distance so as to permit removal of the part from the apparatus;
   means for axially moving at least one of said first and second mold plates between the mold open position and the mold closed position;
   a mold cavity rotator rotationally coupled to the mold cavity for rotating the mold cavity about the mold axis;
   driving means for rotating the mold cavity rotator; and
   control means to effect operation of the driving means, causing rotation of the mold cavity in an unthreading direction as the first and second mold plates are separated from the mold closed position to the mold open position.

2. The apparatus according to claim 1, additionally comprising mating means on a portion of the mold cavity, the mating means preventing slippage of the part relative to the mold cavity during unthreading of the molded part from the mold core.

3. The apparatus according to claim 2, wherein the mating means is provided on an inner axial surface of the mold cavity.

4. The apparatus according to claim 3, wherein the mating means comprises axially extending serrations.

5. The apparatus according to claim 1, additionally comprising means for applying vacuum to the mold core to create a negative pressure in a space which is formed between the molded part and the mold core during unthreading of the molded part from the mold core, the negative pressure being sufficient to retain the molded part on the mold core after it is completely unthreaded.

6. The apparatus according to claim 5, wherein said means for applying vacuum includes an air passage extending through said mold core through which the vacuum is applied, the air passage opening into the space formed between the molded part and the mold core during unthreading.

7. The apparatus according to claim 6, wherein the mold core comprises a core body and a core insert, and said air passage through said mold core comprising a bore extending through the core body and core insert and a gap between said core insert and said core body, the gap communicating with the bore and opening into the space between the mold core and the molded part, the gap being sufficiently narrow that molten plastic does not enter the gap during molding.

8. The apparatus according to claim 1, additionally comprising a third mold plate to which a stripper ring is mounted wherein, in the mold closed position, the stripper ring engages the mold cavity and defines a portion of an outer surface of the molded part, and wherein relative axial movement of the third mold plate and the first mold plate away from one another after separation of the mold core and the cavity to the mold open position causes the stripper ring to eject the part from the mold core.

9. The apparatus according to claim 8, wherein the stripper ring is provided with at least one bore through which pressurized air is passed to assist in ejecting the part from the mold core.

10. The apparatus according to claim 1, additionally comprising a mold cavity rotator mounted in the second mold plate, the mold cavity rotator comprising:
   a rotatable shaft rotatable about the mold axis and being coupled to the driving means,; and
   a radially extending drive pinion mounted on said rotatable shaft which meshes with a pinion extending radially about the mold cavity, wherein rotation of the mold cavity rotator in a direction opposite the unthreading direction causes rotation of the mold cavity in the unthreading direction.

11. The apparatus according to claim 10, wherein the driving means comprises a transversely extending rack, the rack having gear teeth which mesh with corresponding teeth on the shaft of the mold cavity rotator.

12. The apparatus according to claim 10, additionally comprising a nozzle portion through which molten plastic is injected into the mold, the nozzle portion being housed in a gate insert portion, and wherein the mold cavity comprises an annular body surrounding the gate insert portion and engaging the gate insert portion with the apparatus in the mold closed position.

13. The apparatus according to claim 12, wherein said gate insert is axially moveable relative to the mold cavity, and wherein both the gate insert and the mold cavity have tapering sealing surfaces which engage one another in the mold closed position.

14. The apparatus according to claim 13, wherein the gate insert and the mold cavity together define a major portion of an outer surface of the molded part.

* * * * *